B. S. LEE.
MOUNTING FOR ELECTRICAL APPLIANCES.
APPLICATION FILED APR. 19, 1920.
1,406,988.
Patented Feb. 21, 1922.
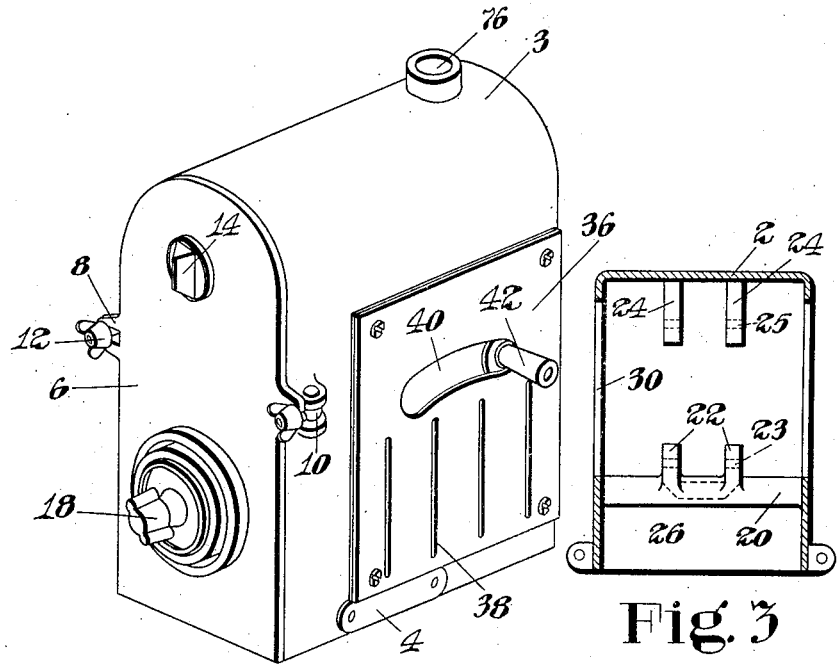
Fig. 3
Fig. 1
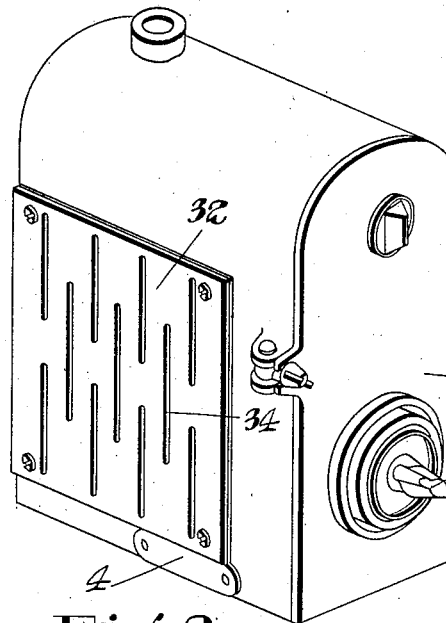
Fig. 2
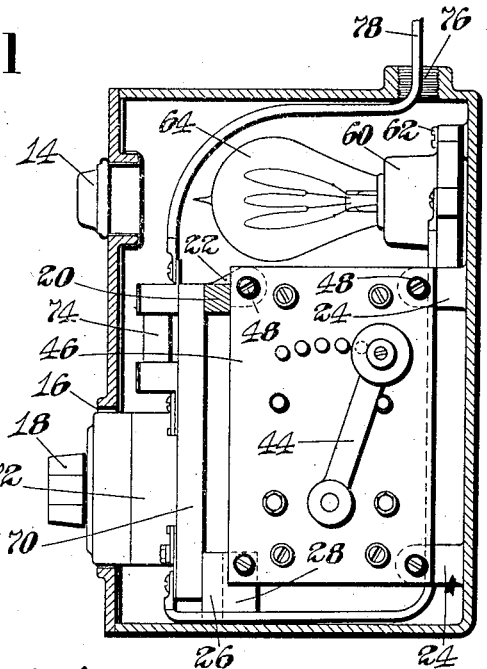
Fig. 4
INVENTOR
Bernard S. Lee
By his Attorney,
Nelson W. Howard

UNITED STATES PATENT OFFICE.

BERNARD S. LEE, OF BEVERLY, MASSACHUSETTS, ASSIGNOR TO UNITED SHOE MACHINERY CORPORATION, OF PATERSON, NEW JERSEY, A CORPORATION OF NEW JERSEY.

MOUNTING FOR ELECTRICAL APPLIANCES.

1,406,988.   Specification of Letters Patent.   Patented Feb. 21, 1922.

Application filed April 19, 1920. Serial No. 374,970.

*To all whom it may concern:*

Be it known that I, BERNARD S. LEE, a citizen of the United States, residing at Beverly, in the county of Essex and State of Massachusetts, have invented certain Improvements in Mountings for Electrical Appliances, of which the following description, in connection with the accompanying drawings, is a specification, like reference characters on the drawings indicating like parts in the several figures.

This invention relates to mountings for electrical appliances, and more particularly to a mounting or housing to support and protect a switch, a lamp and a rheostat, such as is used for example, on embossing, stamping or other machines where regulated heat is employed. It is apparent, however, that in many aspects, the invention is not limited to the mounting of these particular appliances nor to any specific machine.

A particular object is to provide a mounting or housing which will be applicable to a large variety of machines and one that can be easily attached in any one of a variety of places, thus rendering it possible to have the rheostat mounted where it can be operated without interference by extraneous objects. In the illustrative embodiment the rheostat is made reversible so that it can be operated from either side of the casing. Thus, if its operating handle would encounter other objects if mounted on the right-hand side of the housing, the rheostat can be removed from the housing and inserted into the other side thus bringing its handle into operative position on the left.

Another object of the invention is to provide a mounting or housing in which the desired appliances may be easily and quickly assembled in compact relation, thus lowering the cost, and one in which the securing devices for each of the various appliances will be readily accessible without disturbing the other appliances or their securing means. These appliances are also so arranged that the wiring connections are readily accessible and can be conveniently reached without interference by other parts.

Another object is to provide an inexpensive mounting or casing which will be less bulky and cumbersome than those heretofore employed and in which the contained appliances will be so compactly arranged that a smaller, neater and more sightly housing can be used, and yet one in which durability will not be sacrificed. In the embodiment shown, the rheostat and switch are assembled in the lower portion of the housing and a signal lamp is arranged horizontally over them, thus making it possible to arch the top of the housing inwardly and yet leave room for a compact assembly. The invention also includes a readily detachable front for the housing carrying a bull's eye so that the lamp will be plainly visible from the outside, from several directions, and thus indicate when current is being consumed. The housing not only protects the lamp against injury but it completely encloses the electrical appliances and the construction is thus well adapted to comply with fire insurance laws.

Referring to the figures of the drawings,

Fig. 1 is a perspective view showing the right-hand side of the housing;

Fig. 2 is a similar perspective view showing the other side of the housing;

Fig. 3 is a horizontal section taken just below the lamp and showing the housing with the rheostat and switchboard removed;

Fig. 4 is a vertical section through the housing showing the rheostat in side elevation.

The mounting or housing 2 is provided with flat sides and ends and an arched top 3 and the flat sides have securing plates 4 on each side which may be tapped or bored for ready attachment to any suitable bracket on the machine. The housing has a removable front plate 6 having slotted securing lugs 8 adapted to be engaged by pivoted bolts 10 which are provided with winged nuts 12. Near the top of the removable plate 6 is a transparency or bull's eye 14 for the purpose of rendering an enclosed lamp visible to indicate when current is being consumed, and a circular slot 16 in the lower part of the cover 6 provides for the operation of a projecting switch button 18 on a switch box 72 inside the housing.

To provide for ready attachment and reversal of the rheostat 46, a cross bar 20 is cast integrally with the housing 2 and is formed with a pair of securing lugs 22 apertured at 23 for the insertion of screws 48. From the rear of the housing project two pairs of securing lugs 24 which are apertured at 25 and on the bottom of the housing is a U-shaped plate 26 with apertured sides 28. These lugs and securing devices are symmetrically arranged so that the rheostat may be reversed if desired and still occupy the same relative position with reference to the other parts.

To provide for convenient access to the rheostat to detach it or to operate it, the housing has at each side corresponding openings 30, one of these being covered by a removable side plate 32 having suitable ventilating slots 34. The other opening is closed by a plate 36 having ventilating slots 38 and an arc-shaped slot 40 through which projects the handle 42 carried on the end of an arm 44 of a rheostat 46. The rheostat 46 is secured by the screws 48 to the lugs, above mentioned, and can be readily detached. If there are any extraneous objects which would interfere with the handle 42 when on the right side of the housing, the cover plates 36 and 32 may be interchanged and the rheostat may be detached and inserted in the other side of the housing whereupon it can be operated from the left.

In order to indicate when current is being consumed, a lamp socket 60 is attached by screws 62 to the housing above the rheostat and a lamp 64 is mounted horizontally in this socket in a position to shine through the bull's eye 14. To the front of the cross bar 20 and in front of the plate 26 is secured a switch base 70 carrying a switch box 72 and fuses at 74. This switch base, and parts carried thereby, are rendered accessible by the removal of the cover plate 6. The casing may be provided with an opening at 76 for the reception of leading-in wires 78, and any other suitable openings, not shown, may be provided at the bottom for leading-out wires. Any suitable electrical connections may be provided and it will be noted that these are all rendered accessible by the removal of the detachable plates.

Having thus described my invention, what I claim as new and desire to secure by Letters Patent of the United States is:

1. A mounting for electrical appliances comprising a housing provided with an internally projecting portion arranged to have secured to it within the housing a rheostat and a switch.

2. A mounting for electrical appliances comprising a housing provided with an internal cross bar arranged to have an electrical appliance secured to either side.

3. A mounting for electrical appliances comprising a housing provided with an internal cross bar arranged to have an electrical appliance secured to each side, and means arranged to allow convenient presentation of the appliances to the cross bar from outside the housing.

4. A mounting for electrical appliances comprising a housing provided with an internally projecting portion near the front, an electrical appliance arranged to be secured to the front of the projecting portion and transversely of the housing, and another electrical appliance arranged to be secured to the rear of the projecting portion and longitudinally of the housing.

5. A mounting for electrical appliances comprising a housing having securing lugs symmetrically arranged, and means to secure a rheostat to the securing lugs with its operating handle reaching to either side of the housing.

6. A mounting for electrical appliances comprising a housing having integral, internally-projecting portions, a reversible rheostat, and means to secure the rheostat to the projecting portions, said means being adapted to secure the rheostat with its operating handle extending to either side of the housing.

7. A mounting for electrical appliances comprising a housing having securing lugs and a cross-bar, means to secure a rheostat to the lugs and cross-bar, and removable sides for the housing so arranged that the rheostat may be inserted from either side of the housing.

8. A mounting for electrical appliances comprising a housing having internally projecting portions, means to secure a rheostat to the projecting portions, a switch base secured to the projecting portions, a lamp secured in the housing, and a removable front for the housing carrying a transparency.

9. A mounting for electrical appliances comprising a housing having securing lugs, means to secure a rheostat to the lugs, a switch secured in front of the rheostat, a signal lamp secured over the rheostat, and a removable front for the housing carrying a transparency.

10. A mounting for electrical appliances comprising a housing having internally projecting portions, means to secure a rheostat to the projecting portions, removable sides for the housing whereby the rheostat may be inserted from either side, a switch base secured to the projecting portions, and a removable front for the housing whereby the switch base may be easily attached.

11. A mounting for electrical appliances comprising a housing having internally projecting portions, means to secure a rheostat to the projecting portions, removable sides for the housing whereby the rheostat may be inserted from either side, a switch base secured to the projecting portions, a lamp secured in the housing and a removable front for the housing whereby the switch base and lamp may be easily attached.

12. A mounting for electrical appliances comprising a housing having corresponding openings at the sides, a cover plate for one opening, a slotted cover plate for the other opening, a reversible rheostat inside the housing and having an operating handle extending through the slot of the cover plate, means to secure the cover plates to the housing in reversed relation, and means to secure the rheostat in reversed position with its operating handle extending to the other side of the housing.

13. A mounting for electrical appliances comprising a housing having flat sides and a curved top, a rheostat and switch secured in the lower portion of the housing and a lamp secured horizontally inside the curved top.

14. A mounting for electrical appliances comprising a housing, a detachable front plate for the housing having an opening for a switch, and a bull's eye carried by the detachable plate to render visible an enclosed light.

15. In a device of the class described, a housing having internal projections and a slotted cover plate, a rheostat, means for securing the rheostat to the projections inside the housing, and operating means for the rheostat extending through the slotted cover plate.

In testimony whereof I have signed my name to this specification.

BERNARD S. LEE.